Aug. 23, 1960 W. L. PLUNKETT 2,950,278
MANUFACTURE OF NITROCELLULOSE
Filed April 15, 1957

WARREN L. PLUNKETT
*INVENTOR.*

BY *Ernest G. Peterson*

AGENT

United States Patent Office 2,950,278
Patented Aug. 23, 1960

2,950,278

MANUFACTURE OF NITROCELLULOSE

Warren L. Plunkett, Sayreville, N.J., assignor to Hercules Powder Company, Wilmington, Del., a corporation of Delaware Filed Apr. 15, 1957, Ser. No. 652,828

10 Claims. (Cl. 260—220)

This invention relates to the manufacture of nitrocellulose and, more particularly, to an improved method and apparatus for the continuous nitration of cellulose.

Although various expedients for continuous nitration of cellulose have been proposed heretofore, it is a noteworthy fact that commercial nitration of cellulose is still substantially universally a batch process, even though batch nitration is recognized to have certain inherent disadvantages such as high manpower requirements, nonuniformity which necessarily accompanies small batch handling, and an inability to lend itself to automatic process control. Continuous cellulose nitration processes proposed heretofore have been deficient for various reasons, principally because they have proved to be unattractive economically in comparison to the well-established batch nitration process, and/or the nitrocellulose produced by such previously proposed continuous processes has been deficient in quality in comparison to nitrocellulose produced by the well-established batch process.

Accordingly, it is an object of this invention to provide an improved method and apparatus for continuous nitration of cellulose having great diversity for overcoming the deficiencies of prior art methods of cellulose nitration.

It is a further object of this invention to provide an improved method and apparatus for continuous nitration of cellulose which overcomes the major disadvantages of batch nitration in that manpower requirements are reduced, a more uniform nitration of the cellulose is afforded, and automatic process control is readily applicable.

Other objects of the invention will appear hereinafter, the novel features and combinations being set forth in the appended claims.

Generally described, the continuous manufacture of nitrocellulose in accordance with this invention comprises continuously bringing together separate streams of cellulose and nitrating mixture with agitation in a first reaction zone to form a slurry, continuously advancing the resulting slurry through a plurality of successive reaction zones in a continuous alternately descending and ascending stream to form nitrocellulose, continuously agitating the slurry in each descending and ascending portion of said stream to prevent segregation of solids from the slurry, and continuously withdrawing a slurry of nitrocellulose in spent nitrating mixture from the final reaction zone.

In practicing this invention, it is desirable to rapidly wet the charged cellulose with nitrating mixture to form a slurry in the first reaction zone, preferably by spraying the incoming cellulose stream with the nitrating mixture. In a preferred embodiment of the invention, hydraulic gradient is the only motivating force employed to advance the slurry through the succession of reaction zones, and residence time of the reaction slurry in the nitrator is controlled and regulated primarily by adjusting the rate of introduction of the cellulose and nitrating mixture streams.

Improved apparatus for practicing continuous nitration of cellulose in accordance with this invention comprises in combination a horizontally elongated vessel to hold a reaction slurry of cellulose suspended in nitrating mixture, said vessel having a first series of weirs and a second series of weirs in alternate parallel-spaced relationship separating the interior of said vessel into a plurality of communicating reaction chambers from end to end thereof, said weirs forming common flat-walled partitions between adjacent communicating reaction chambers, each of said first weirs being in contact with both sides of the vessel and extending vertically downward from above the level of reaction slurry maintained in the vessel and terminating short of the bottom of the vessel to provide underflow communication between adjacent reaction chambers, each of said second weirs being in contact with the bottom and both sides of the vessel and extending vertically upward and terminating below the level of reaction slurry maintained in the vessel to provide overflow communication between adjacent reaction chambers, agitating means disposed in each reaction chamber, said vessel having a first charge means and a second charge means at one end thereof for introducing separate streams of cellulose and nitrating mixture, respectively, into the first of said communicating reaction chambers, and a discharge means at the other end thereof for withdrawing a slurry of nitrocellulose in spent nitrating mixture from the last of said communicating reaction chambers.

A preferred embodiment of the invention has been chosen for purposes of illustration and description and is shown in the accompanying drawing forming a part of the specification wherein reference symbols refer to like parts wherever they occur, and wherein valves, gages, and other auxiliary equipment have been omitted for the sake of simplicity.

Figure 1:
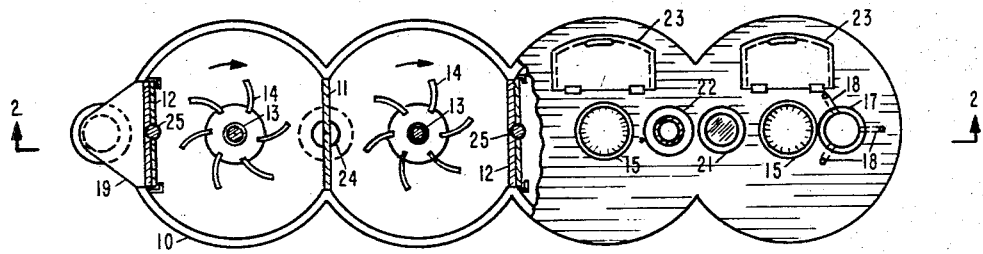
Fig. 1 is a plan view partly in section of the improved apparatus for continuous nitration of cellulose in accordance with this invention.

With reference to the figures, there is provided a horizontally elongated vessel 10 to hold a reaction slurry of cellulose suspended in nitrating mixture. Vessel 10 is provided with a first series of weirs 11 and a second series of weirs 12 in an alternate parallel-spaced relationship separating the interior of vessel 10 into a plurality of communicating reaction chambers or zones A, B, C, and D from end to end thereof, weirs 11 and 12 forming common flat-walled partitions between adjacent communicating reaction chambers. Each of the first weirs 11 is in contact with both sides of vessel 10 and extends vertically downward from above the level of reaction slurry maintained in vessel 10 and terminates short of the bottom of vessel 10 to provide underflow communication between adjacent reaction chambers. Each of the second weirs 12 is in contact with the bottom and both sides of vessel 10 and extends vertically upward and terminates below the level of reaction slurry maintained in vessel 10 to provide overflow communication between adjacent reaction chambers.

An agitator shaft 13 is disposed in each of reaction chambers A, B, C, and D, and is provided with mixing blades 14 at a plurality of positions on each shaft for creating a plurality of intrastream circulations within the body of slurry in each reaction chamber to prevent segregation of solids from the reaction slurry, and to insure maintaining an intimate and uniform dispersion of the solids within the nitrating mixture. Driving means 15 operatively connected to the upper end of each agitator shaft 13 provide rotative power therefor, and a stabilizer or balancing ring 16 affixed adjacent the lower end of each shaft 13 minimizes shaft wobble during operation.

Vessel 10 is provided at one end thereof with a first charge means 17 for introducing cellulose and a second charge means 18 for introducing nitrating mixture into the first reaction chamber A, and a discharge means 19 at the other end thereof for withdrawing a slurry of nitrocellulose in spent nitrating mixture from the last reaction chamber D. Vessel 10 is also provided with sight glasses 21, fume exhaust tubes 22, manual access doors 23, and clean-out drains 24 which are disposed in the bottom of vessel 10 beneath each of the first weirs 11. In the embodiment illustrated, each of the second weirs 12 is adjustable in a vertical plane by means of threaded adjusting rods 25.

Figure 2:
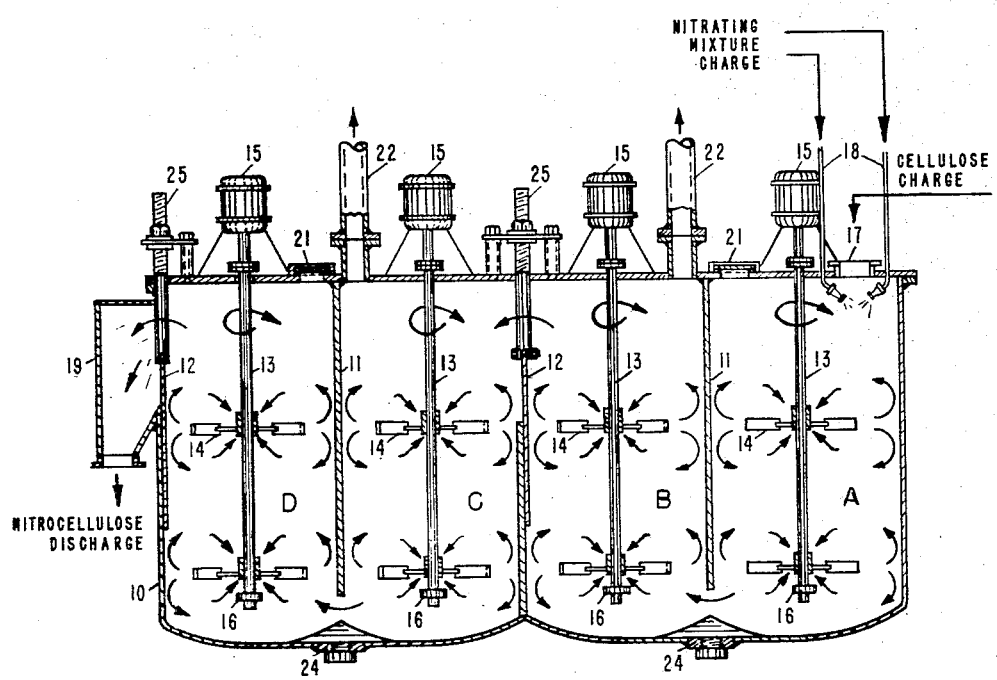
Fig. 2 is a vertical view in section taken along section 2—2 of Fig. 1.

According to a preferred method of operation, fresh nitrating mixture via second charge means 18 is continuously introduced into reaction chamber A at a predetermined rate. When the nitrating mixture has filled reaction chambers A and B to a level where it begins to flow over weir 12 into reaction chamber C, the agitators 13 in each of the reaction chambers are turned on, and cellulose via first charge means 17 is introduced continuously into reaction chamber A at a predetermined rate. In a preferred embodiment of the invention the cellulose upon entering reaction chamber A passes through a spray of nitrating mixture, introduced via second charge means 18, which rapidly wets the cellulose and forms a reaction slurry therewith. The agitated reaction slurry thus formed then advances continuously under the influence of hydraulic gradient successively through reaction chambers A, B, C, and D in a continuous alternately descending and ascending stream during which the nitrating mixture reacts with the cellulose to form nitrocellulose, and a slurry of nitrocellulose in spent nitrating mixture is continuously withdrawn via discharge means 19. With reference to Fig. 2 it will be apparent that the reaction slurry descends in reaction chamber A, passes under weir 11 into reaction chamber B where it ascends, flowing over weir 12 into reaction chamber C where it again descends and passes under weir 11 into reaction chamber D. The reaction slurry then ascends through reaction chamber D and overflows in a continuous stream over weir 12 into nitrocellulose discharge port 19. The operating level of reaction slurry in the nitrator is governed by the height at which weirs 12 are adjusted. Residence time of the reaction slurry in the nitrator is governed by the rate at which nitrating mixture and cellulose are introduced to the nitrating vessel, and sufficient residence time is provided to permit the nitration reaction to proceed to completion, the extent of nitration at equilibrium being governed primary by the composition of the nitrating mixture.

The reaction slurry is agitated at a plurality of levels in each of the reaction chambers, and the degree of agitation is sufficient to maintain a uniform suspension of the solid cellulosic phase in the nitrating mixture, and prevent any segregation, settling out or channeling of the solid cellulosic phase in uninterrupted flow streams. The degree of agitation preferably should not be so vigorous as to cause splashing, or cause a breaking up or comminution of the cellulosic particles or fibers. The weirs 11 and 12 effectively prevent recirculation of the advancing agitated reaction slurry back into a preceding reaction chamber, and the agitated slurry advances positively through the nitrator under the influence of hydraulic gradient created by the incoming charge streams of cellulose and nitrating mixture.

The discharged stream of nitrocellulose suspended in spent nitrating mixture leaving the nitrator via discharge port 19 is then subjected to conventional processing involving separation of spent nitrating mixture from the nitrocellulose, followed by well-known treatment for stabilization, viscosity control, bleaching, dehydration, and the like, as necessary or desirable in the manufacture of nitrocellulose.

Whereas the geometrical configuration of the continuous nitrating apparatus, as illustrated in the drawing, has proved to be both economical to construct and very practical in use, the invention is by no means limited either with respect to geometric configuration of the nitrating apparatus or with respect to the number of communicating reaction chambers in the nitrating vessel. With respect to geometric configuration, in addition to the configuration illustrated, vessel 10 could be constructed to provide reaction chambers which are variously polygonal in cross-section, such as, rectangular, hexagonal, octagonal, decagonal, and the like. The reaction chamber bottoms, instead of being shallowly dished as illustrated, could be flat, or of other equivalent configuration which will not lead to substantial spaces or volumes incapable of being efficiently agitated, which would favor separation and settling out of solid cellulosic phase.

Instead of four reaction chambers as illustrated, the nitrating vessel can be constructed with 2, 6, 8, 10 or more communicating reaction chambers, as desired, and it is important to note that for a preselected residence time the throughput capacity of the nitrating apparatus of this invention increases with increasing number of reaction chambers, other factors in construction remaining constant. In practice the number of reaction chambers will be dictated by the size of the chambers, the capacity desired, and the residence time required.

It will be noted that weirs 11 are in contact with both sides of vessel 10 and extend vertically downward from above the level of reaction slurry maintained in the vessel and terminate short of the bottom of the vessel to provide underflow communication between adjacent reaction chambers. These weirs are imperforate and form common flat-wall partitions between adjacent communicating reaction chambers. Weirs 11 may be fixed or adjustable vertically as desired. The minimum size of the underflow communicating space provided by weirs 11 must be at least sufficient in cross-sectional area to permit underflow passage of the reaction slurry as rapidly as cellulose and nitrating mixture are introduced to the nitrating vessel without any appreciable holdup. Normally, however, these underflow communicating spaces will be somewhat larger in cross-section than the minimum, that is, up to about one-quarter to half the cross-sectional area of one of the reaction chambers. Larger cross-sectional area than approximately half the cross-sectional area of one of the reaction chambers contributes no additional benefits, while complicating the agitation problem to prevent quiet unagitated areas or channeling into uninterrupted flow streams of only partly nitrated particles too rapidly through the nitrating vessel. By making these weirs adjustable vertically, it becomes a simple matter to control the cross-sectional areas of the underflow passages for optimum performance of the nitrator under various conditions of slurry consistency, agitation, and the like.

Weirs 12 are in contact with the bottom and both sides of vessel 10 and extend vertically upward and terminate below the level of reaction slurry maintained in the vessel to provide overflow communication between adjacent reaction chambers. Weirs 12, like weirs 11, are imperforate and form common flat-wall partitions between adjacent communicating reaction chambers. Preferably, weirs 12 are adjustable vertically; however, they may be made stationary, if desired. One of the purposes of weirs 12 is to adjust and regulate the height of reaction slurry in the nitrating vessel, and to control the hydraulic gradient which advances the reaction slurry through the several reaction chambers of the nitrating vessel. Raising weirs 12 increases residence time by increasing volume of the chambers, other factors remaining constant.

An important function of both weirs 11 and weirs 12 is to prevent recirculation of advancing reaction slurry back into a preceding reaction chamber. Such recirculation is undesirable since it would lead to nonuniform holdup of nitrated cellulose with consequent nonuniformity in the product produced. Another important function of the flat-walled weirs 11 and 12 is to aid in creating and maintaining uniform mixing of the reaction slurry in all parts of the nitrating vessel. These weirs accomplish this by interrupting the centrifugal swirl set up by the agitator blades and causing the swirling slurry to roll over on itself and re-enter the vortex, thus promoting good mixing and avoiding channeling of material into uninterrupted flow streams adjacent to the side walls of the reaction chambers. Under certain circumstances, it may be found desirable to supplement the baffling action of the flat-walled weirs with additional baffles suitably disposed on the side walls of the reaction chamber.

In order to obtain a uniform nitrocellulose product, it is necessary by good mixing action to continuously maintain a uniform dispersion of cellulosic material in nitrating mixture in all parts of the nitrating vessel. Suitable agitators 13 disposed in each of the several communicating reaction chambers of the nitrating vessel are provided to accomplish this objective. The type of agitation provided promotes good mixing of the reaction slurry in all parts of the nitrating vessel without channeling of material into uninterrupted flow streams and without providing a propelling force tending to advance the reaction slurry without interruption through the several communicating reaction chambers of the nitrating vessel. A desirable form of agitation consists in creating a plurality of intrastream circulations in the reaction slurry in each of the several communicating reaction chambers of the nitrating vessel wherein efficient uniform mixing of the reaction slurry is accomplished without creation of uninterrupted flow streams.

Agitator shafts having open swept back turbine blades 14 affixed at two or more positions on each shaft are illustrated in the drawing for creating the type of agitation suitable for the purposes of this invention. However, the invention is not limited in this respect, since, in addition to turbine blades, paddle blades, propeller blades, and other forms of agitator blades can be employed, in various combinations, to provide the necessary mixing action to accomplish the purposes of this invention. Suitable combinations of agitating blades to obtain the necessary type of mixing action required by this invention will readily suggest themselves to anyone skilled in the art having a knowledge of the type of motion imparted to a liquid slurry by each particular type and form of agitating blade and a knowledge of the type of mixing and agitation required by this invention. When turbine blades are employed, it is important to note that the turbine blades at the lowermost position on each agitator shaft must be located in a horizontal plane above the lower termination of weirs 11 in order to operate properly. Propeller blades, if employed at the lowermost position on the agitator shafts, may, if desired, be disposed in a plane below the lower termination of weirs 11, and will operate properly when so located because of their inherent tendency to draw material into an axial vortex from one driection and propel it from the vortex in the opposite direction. Turbine blades, on the other hand, draw fluid into axial vortex both from above and below and expel fluid centrifugally at right angles to the axial vortex flow. It is a cardinal principle, of course, that propeller blades disposed at the lowermost position on the agitator shafts are always pitched to create a lifting motion to the fluid slurry.

Rotative power to operate the agitators may be derived from individual power sources such as a hydraulic or an electric motor operatively connected to each agitator shaft, or alternatively, operative power for all agitators may be derived from a single power source by employment of suitable power take-off devices such as pulleys, gears, and the like. It is highly desirable in accordance with a preferred embodiment of the invention to provide means for independent adjustment of the rate of rotation of each agitator. A very convenient means for accomplishing this objective is to provide a separate variable speed or multispeed motor for each agitator.

The rotation, which may be unidirectional as illustrated or multidirectional, is adjusted so that the rate of rotation of each agitator maintains uniform distribution of the solid cellulosic phase in the nitrating mixture without segregation or settling out of solids from the reaction slurry, and the degree of agitation required to accomplish this objective will depend on such factors as the physical form of the cellulose employed, the ratio of cellulose to nitrating mixture, and the type of agitating blades employed. Having adjusted the rate of rotation of the agitators to obtain good mixing sufficient to maintain uniform distribution of the solid cellulosic phase in the nitrating mixture, there is no advantage to be gained by increasing rate of rotation still further since this would involve an uneconomic expenditure of power and could lead to undesirable splashing of the reaction slurry or even to comminution of the cellulosic particles which is also undesirable.

The cellulose charge means 17 can be any suitable tube, pipe, chute, port or equivalent structure of sufficient cross-sectional area to accommodate uniform flow of the cellulose charge stream at the required rate without plugging up or bridging of the cellulose and it is within the scope of this invention to employ more than one cellulose charge means when necessary or desirable.

The nitrating mixture charge means 18 can be one or a plurality of pipes or tubes having sufficient aggregate cross-sectional area to accommodate continuous and unimpeded introduction of the nitrating mixture at the required rate. Preferably the nitrating mixture charge means is provided with spray nozzles or equivalent delivery nozzles for breaking up the incoming charge stream of nitrating mixture into a spray. Since it is highly desirable to promote rapid wetting out of the cellulosic phase with formation of a reaction slurry of cellulose suspended in nitrating mixture, at least part of the charge stream of nitrating mixture should be sprayed or discharged directly onto and into the charge stream of cellulose. Accordingly, at least part of the aforementioned spray nozzles should desirably be disposed and oriented to direct a spray of nitrating mixture directly onto and into the charge stream of cellulose, and a convenient and practical arrangement to accomplish this involves employment of a plurality (any convenient number) of nitrating mixture charge means 18 disposed around the periphery of the cellulose charge means. It is to be understood, however, that the invention is not limited in this respect, for under certain circumstances it has been found desirable to introduce at least part of the nitrating mixture stream otherwise than by directing it directly onto and into the charge stream of cellulose. For example, with some types of cellulose charge there is a tendency for cellulose dust to collect on the exposed surfaces of the first reaction chamber A above the slurry level in said chamber. In such cases it is necessary to wash or bathe these areas with at least a portion of the incoming nitrating mixture charge in order to keep cellulose dust from accumulating and keep these areas clean. This can be accomplished by disposing and orienting at least part of the nitrating mixture charge means 18, preferably provided with spray nozzles, to direct at least a portion of the incoming nitrating mixture charge onto the exposed surfaces of the first reaction chamber A above the slurry level in said chamber. As an alternating arrangement, instead of employing a plurality of nitrating mixture charge means, a single nitrating mixture pipe, tube, or equivalent port completely surrounding and concentrically spaced apart from the cellulose charge means to deliver a substantially continuous annular curtain of nitrating mixture around the periphery of the incoming cellulose charge stream can be employed, if desired.

The nitrocellulose discharge means 19 can be any conveniently shaped pipe, tube, chute, or similar discharge port of sufficient cross-sectional area to accommodate the slurry of nitrocellulose in spent nitrating mixture discharged from the final reaction chamber without impeding such discharge.

Any of the usual commercial forms of cellulose, such as cotton, purified cotton linters, purified wood pulp, regenerated cellulose, and the like can be employed in practicing this invention. The cellulose will be in bulk form such as picked linters, shredded wood pulp, fluffed bulk fibers, granules, finely ground or cut fibers, film shreds, and the like.

This invention contemplates the continuous formation of all commercial types of nitrocellulose embracing the entire range of useful nitrogen content. For this purpose, any of the known mixed acid compositions which have been employed to prepare nitrocellulose may be employed. For example, the nitrating mixture can be the usual mixed acids made up of various mixtures of nitric acid, sulfuric acid and water. Typical commercial nitrating acids and the nitrogen content of nitrocelluloses produced therefrom are set forth in Table 7 on page 722, Cellulose and Cellulose Derivatives, 2nd edition, part II, edited by Emil Ott and Harold M. Spurlin, Interscience Publishers, Inc., New York, New York, copyright, 1954. Other typical nitrating mixtures involving mixtures of nitric acid, sulfuric acid and water appear in Table 5, page 719, and in Table 6, page 720, of the above-cited text on Cellulose and Cellulose Derivatives.

However, nitration of cellulose with mixtures of nitric acid, sulfuric acid and water in accordance with this invention is by no means limited to mixtures as illustrated in Tables 5, 6 and 7 of the aforementioned text on Cellulose and Cellulose Derivatives. It has been found that mixtures of nitric acid, sulfuric acid and water which contain up to about 75% by weight of nitric acid are eminently satisfactory nitrating mixtures for the purposes of this invention. For convenience, such mixtures may be termed high nitric acid-low sulfuric acid nitrating mixtures since the weight of nitric acid always exceeds the weight of sulfuric acid in such mixtures. Above about 75% nitric acid by weight in such mixtures, however, the ratio of sulfuric acid is so low that it loses its effectiveness as a dehydrating agent, with resultant non-uniform nitration. It is presently preferred to employ high nitric acid-low sulfuric acid nitrating mixtures containing between about 67% and about 73% nitric acid, the sulfuric acid and water content of such mixtures being proportioned to obtain the desired level of nitrogen substitution in the cellulose in accordance with the usual established practice in the art.

In general, the nitration of cellulose is much more rapid in these high nitric acid-low sulfuric acid nitrating mixtures than in the more conventional type of nitrating mixtures as illustrated in Tables 5, 6 and 7 of the above text on Cellulose and Cellulose Derivatives. For example, shredded wood pulp has been uniformly nitrated in as short a time as 2 minutes with high nitric acid-low sulfuric acid nitrating mixtures, whereas ordinarily about 18 minutes is required for uniform nitration with conventional nitrating mixtures. Moreover, less attention to selection of the type and preparation of the cellulose for nitration is required when employing high nitric acid-low sulfuric acid nitrating mixtures than is necessary with more conventional nitric acid-sulfuric acid nitrating mixtures.

It is well-recognized in the art that considerable care and attention must be directed to proper cellulose preparation in order to obtain uniform nitration employing conventional nitric acid-sulfuric acid nitrating mixtures. For example, cotton linters must be thoroughly fluffed up and must be substantially free of all closely packed aggregates of fibers such as balls, pills and the like. Wood pulp must be shredded completely to thoroughly open up the fiber aggregates. Generally it has been necessary when employing conventional nitric acid-sulfuric acid mixtures to select wood pulp sheets of soft or medium formation to obtain the proper degree of opening up of the fiber aggregates. Wood pulp sheets of hard formation are very difficult to shred properly in order to obtain uniform nitration with conventional nitrating mixtures. Moreover, sulfate pulps have led to difficulty when attempting to nitrate such material to gun cotton specifications. On the other hand, high nitric acid-low sulfuric acid nitrating mixtures have been successfully employed to nitrate cotton linters, either as picked linters or in the form of granules or tablets, prehydrolyzed sulfate wood pulp, sulfate wood pulp and sulfite wood pulp of soft, medium and hard sheet formations, either shredded or in granular or tablet form. Moreover, sulfate wood pulp has been readily nitrated to gun cotton specifications.

Thus, it will be apparent that high nitric acid-low sulfuric acid nitrating mixtures will be preferred over more conventional mixtures of nitric acid and sulfuric acid for certain situations, particularly for nitration of sulfate pulps to high nitrogen levels, for nitration of wood pulp of hard sheet formation or wood pulp or linters in the form of granules, pellets or tablets, or in situations where a more rapid nitration cycle than is possible with more conventional nitrating mixtures is necessary or desirable.

Table I following illustrates some typical examples of cellulose nitration employing high nitric acid-low sulfuric acid nitrating mixtures.

Thus, it will be seen that within Tables 5, 6 and 7 of the Ott and Spurlin text on Cellulose and Cellulose Derivatives cited hereinabove, and within Table I above relating to high nitric acid-low sulfuric acid nitrating mixtures, there are listed various nitrating mixtures for preparing any particular nitrocellulose desired. Likewise, within these tables there are listed nitrating mixtures suitable for preparing substantially all commercial types of nitrocellulose. The particular nitrating mixture employed will, therefore, be largely a matter of choice governed by economic and end use considerations. For certain purposes, when desirable, the sulfuric acid in such mixed acids can be replaced with phosphoric acid, phosphorus pentoxide or acetic anhydride as the dehydrating agent.

Alternatively, the nitrating mixtures of this invention may be various mixtures of nitric acid, magnesium nitrate and water, the ratio of magnesium nitrate to water being at least about 1.2:1 and not more than about 2.2:1 by weight and said nitric acid being present in an amount sufficient to yield a nitric acid ester of cellulose having a nitrogen content of from about 11% to about 13.5% by weight. More particularly, such nitrating mixtures will contain essentially between about 45% and about 94% nitric acid, between about 3.3% and about 34% magnesium nitrate, and between about 2.7% and about 21% water by weight, the ratio of magnesium nitrate to water being at least about 1.2:1 and not more than about 2.2:1. It will be understood, of course, that the sum of the three essential components will constitute substantially 100% of the nitrating mixture, any $N_2O_3$ being only an incidental ingredient in the nitrating mixture, since it is well recognized that concentrated nitric acid often contains small percentages of $N_2O_3$, usually Table I

| Ex. | Nitrating Mixture Composition, Percent by Weight | | | | Type of Cellulose | Nitration Temp., °C. | Nitration Time, Min. | Ratio Nitrating Mixture to Cellulose By Weight | Percent Nitrogen in Nitrocellulose |
|---|---|---|---|---|---|---|---|---|---|
| | Nitric Acid | Sulfuric Acid | Oxide Content Expressed as HNOSO$_4$ | Water | | | | | |
| 1 | 71.04 | 13.13 | 2.07 | 13.76 | Shredded sulfite wood pulp. | 40 | 20 | 51:1 | 11.37 |
| 2 | 51.50 | 28.47 | 3.51 | 16.52 | ...do... | 44 | 16 | 54:1 | 11.47 |
| 3 | 60.03 | 22.02 | 2.98 | 14.97 | ...do... | 44 | 16 | 54:1 | 11.60 |
| 4 | 71.27 | 13.54 | 1.66 | 13.53 | ...do... | 50 | 15 | 51:1 | 11.60 |
| 5 | 69.62 | 17.84 | 2.62 | 9.92 | Sulfite wood pulp tablets.[a] | 51 | 20 | 10:1 | 11.86 |
| 6 | 75.63 | 11.46 | 1.24 | 11.67 | Picked linters | 44 | 15 | 40:1 | 11.89 |
| 7 | 70.91 | 14.37 | 2.43 | 12.29 | Shredded sulfite wood pulp. | 50 | 4 | 51:1 | 11.97 |
| 8 | 70.01 | 15.35 | 2.26 | 12.38 | ...do... | 48 | 5 | 40:1 | 11.99 |
| 9 | 70.25 | 14.86 | 2.90 | 11.99 | Shredded Prehydrolyzed sulfate wood pulp hard sheet. | 44 | 10 | 31:1 | 11.99 |
| 10 | 70.25 | 14.86 | 2.90 | 11.99 | Shredded sulfite wood pulp. | 50 | 2 | 31:1 | 12.07 |
| 11 | 69.73 | 16.24 | 2.14 | 11.89 | ...do... | 50 | 2 | 51:1 | 12.18 |
| 12 | 69.10 | 15.84 | 2.93 | 12.13 | Picked linters | 49 | 10 | 41:1 | 12.33 |
| 13 | 69.73 | 16.24 | 2.14 | 11.89 | ...do... | 50 | 10 | 51:1 | 12.46 |
| 14 | 70.74 | 22.68 | 1.24 | 5.35 | Shredded sulfate wood pulp. | 50 | 15 | 51:1 | 13.46 |
| 15 | 74.32 | 21.24 | 0.70 | 3.74 | Picked linters | 34 | 20 | 100:1 | 13.60 |
| 16 | 70.60 | 26.11 | 0.90 | 2.39 | Shredded sulfite wood pulp. | 50 | 5 | 51:1 | 13.62 |
| 17 | 62.75 | 33.75 | 0.93 | 2.57 | Picked linters | 34 | 20 | 100:1 | 13.65 |

[a] The sulfite wood pulp used in Example 5 above was a medium formation sheet cut into tablets 1/16 inch x 1/8 inch x 1/20 inch. The sulfite wood pulp used in Examples 1, 2, 3, 4, 7, 8, 10, 11 and 16 was a medium formation sheet shredded in conformance with conventional practice in the art as set forth in U.S. Patent 2,028,080 to Stern.

on the order of 0.1% or less. Within the aforestated limits are various nitrating mixtures for preparing any particular nitrocellulose desired, as well as nitrating mixtures suitable for preparing substantially all commercial types of nitrocellulose. The particular nitrating mixture employed will, therefore, be largely a matter of choice governed by economic and end use considerations, it being apparent that the higher nitrogen-type nitrocelluloses require nitrating mixtures high in nitric acid content and low in water content within the limits set forth. Table II following lists some typical nitrating mixtures containing essentially nitric acid, magnesium nitrate and water, together with the nitrogen content of nitrocellulose produced therefrom.

Table II

| Example | Nitrating Mixture Composition, Percent by Weight | | | | Percent Nitrogen in Nitrocellulose Produced |
|---|---|---|---|---|---|
| | Nitric Acid | Magnesium Nitrate | Water | N$_2$O$_3$ | |
| 1 | 60.00 | 23.30 | 16.70 | | 11.05 |
| 2 | 56.00 | 27.30 | 16.70 | | 11.76 |
| 3 | 50.00 | 31.72 | 18.28 | | 11.91 |
| 4 | 60.00 | 24.40 | 15.70 | | 11.95 |
| 5 | 54.00 | 29.00 | 17.00 | | 12.16 |
| 6 | 50.00 | 32.70 | 17.30 | | 12.26 |
| 7 | 67.30 | 19.27 | 13.41 | 0.02 | 12.37 |
| 8 | 69.73 | 18.12 | 12.13 | 0.02 | 12.57 |
| 9 | 58.91 | 27.45 | 13.63 | 0.01 | 12.87 |
| 10 | 69.74 | 20.00 | 10.24 | 0.02 | 13.23 |
| 11 | 75.20 | 15.80 | 9.00 | | 13.39 |
| 12 | 89.33 | 5.78 | 4.75 | 0.14 | 13.36 |
| 13 | 84.80 | 9.13 | 6.00 | 0.07 | 13.57 |
| 14 | 79.76 | 11.84 | 8.37 | 0.03 | 12.59 |
| 15 | 93.62 | 3.63 | 2.65 | 0.10 | 12.76 |
| 16 | 90.47 | 5.56 | 3.92 | 0.05 | 13.46 |

The quantity of nitrating mixture employed per part of cellulose in accordance with this invention is sufficient to form a fluid, stirrable slurry therewith, which slurry will flow under the influence of a hydraulic gradient applied to the slurry and which can be agitated to form and maintain a uniform dispersion of cellulose in nitrating mixture. This is the minimum operable quantity, and will vary depending upon the physical form of the cellulose charge employed. For example, dense fibrous granules of cellulose can be readily slurried with as little as 6 parts nitrating mixture to 1 part cellulose by weight. Wood pulp shredded by the method set forth in U.S. Patent 2,028,080 to Stern normally requires about 22 parts nitrating mixture to 1 part of cellulose by weight. On the other hand, wood pulp dry fluffed in the Osterizer, and known in the art as Bauer Dry Fluffed wood pulp, normally requires about 50 parts nitrating mixture to 1 part of cellulose by weight, while wood pulp wet shredded in an Osterizer, and known in the art as Brown Wet Shredded wood pulp, normally requires about 45 parts nitrating mixture to 1 part cellulose by weight. Picked cotton linters normally require about 39 parts nitrating mixture to 1 part of cellulose by weight to form a suitable slurry which can be readily agitated to form and maintain a uniform dispersion of cellulose in nitrating mixture, and which will nitrate to form a uniformly substituted nitrocellulose having desirable solubility characteristics. It will be apparent, of course, that larger quantities of nitrating mixtures can be employed, such as 50 parts, 75 parts, or even 100 parts per part of cellulose, when desired. However, the economics and practical aspects of the system will usually govern the ratio of nitrating mixture to cellulose, it being most economical and practical to nitrate with the lowest ratio that will produce a uniform, high quality nitrocellulose. It should be pointed out, of course, that even 6 parts nitrating mixture to 1 part cellulose represents an excess of nitrating capacity over theoretical stoichiometric requirements to form nitrocellulose.

Successful practice of this invention requires bringing together the separate streams of cellulose and nitrating mixture in a first reaction zone with agitation to form a slurry and maintaining a uniform dispersion of the cellulosic phase in the nitrating mixture throughout the course of the nitration reaction. In forming the slurry of cellulose in nitrating mixture, it is highly desirable to wet out the cellulose with nitrating mixture and disperse the cellulose uniformly through the nitrating mixture as rapidly as possible. In practice this objective has been accomplished by spraying the incoming cellulose charge stream with the incoming nitrating mixture charge stream, and by providing a more vigorous agitation in the first reaction chamber A, than needs to be applied in successive reaction chambers to maintain uniform dispersion of cellulosic phase in the nitrating mixture. For example, in a typical run employing a nitrating vessel having 4 communicating reaction chambers and employing open swept back turbine blades, as illustrated, with wood pulp shredded in accordance with U.S. Patent 2,028,080 to Stern as the cellulosic charge, and employing 26 parts nitrating mixture to 1 part cellulose by weight, the agitators in the first reaction chamber A were rotated at 100 r.p.m. in reaction chamber B at 95 r.p.m., and in each of reaction chambers C and D at 65 r.p.m.

The rate of introduction of the cellulose stream and the rate of introduction of the nitrating mixture stream is each adjusted to maintain the proper ratio with respect to each other to form a suitable reaction slurry, and to provide sufficient residence time of the reaction slurry in the nitrating vessel to permit the nitration reaction to proceed to completion, the extent of nitration at equilibrium being governed primarily by the composition of the nitrating mixture. With conventional nitrating mixtures consisting of mixtures of nitric acid, sulfuric acid and water, it has been established that nitration is substantially complete in about 18 minutes. With high nitric acid-low sulfuric acid nitrating mixtures as illustrated in Table I, many nitrations are substantially complete within 10 minutes or less. Nitration with mixtures of nitric acid, magnesium nitrate and water has been found to be substantially complete within 10 minutes. Knowing these facts, it is a simple matter to adjust the rates of introduction of cellulose and nitrating mixture so that the elapsed time between initial introduction of charge streams and initial discharge of this same material from the nitrating vessel, and thus residence time in the nitrating vessel, is at least sufficient to permit the nitration reaction to proceed to completion. Analysis of the discharged nitrocellulose from nitrogen content and observation of the solubility characteristics of the nitrocellulose provide an ample check on whether sufficient residence time has been provided. If the nitrogen content of the discharged nitrocellulose closely approaches the calculated nitrogen content expected from the nitrating mixture employed, and the discharged nitrocellulose dissolves substantially completely in test solvents to form clear, smooth solutions substantially free of undissolved fibers or particles, it can be concluded that residence time in the nitrating vessel has been sufficient to permit the nitration reaction to go to completion.

A wide range of temperatures can be employed in practicing this invention. For practical reasons, however, it is not desirable to employ temperatures below about 15° C. or higher than about 70° C. Below about 15° C. the reaction becomes too slow to be economically attractive, and above 70° C. the nitrocellulose tends to decompose. A preferred range of temperatures lies between about 20° C. and about 50° C. These temperatures are readily attained by heating the nitrating mixture to the desired temperature prior to introduction into the nitrating vessel. Ordinarily, heat exchange facilities, such as vessel jacketing, is not necessary in order to maintain the desired reaction temperature, since the heat of reaction absorbed by the relatively large volume of nitrating mixture employed just about balances out heat lost from the nitrating vessel by conduction, radiation, and other means. However, it is within the scope of this invention to employ heating or cooling means, such as vessel jacketing or equivalent means, when necessary or desirable, to maintain reaction temperatures at any predetermined desirable level, or within any predetermined temperature range.

The nitrating apparatus in accordance with this invention should be constructed of metal which is resistant to corrosion by the nitrating mixtures employed. Ordinary carbon steels will suffice when employing mixtures of nitric acid, sulfuric acid and water. However, mixtures of nitric acid, magnesium nitrate and water dictate employment of stainless steel equipment to avoid excessive corrosion.

The following examples set forth specific embodiments of the invention. It is to be understood, however, that these examples, while illustrative, are not to be construed as a limitation of the invention.

EXAMPLE 1

In this example the nitrating vessel was constructed as illustrated in the drawing with 4 communicating reaction chambers each approximately 3 feet in diameter and 5 feet deep. The openings in the underflow weirs 11 were each approximately 100 square inches. The agitators in reaction chamber A were 2 six-bladed open swept back turbines 21.7 inches in diameter with blades approximately 5¾ inches wide. The lower turbine was located approximately 16 inches from the bottom of the reaction chamber, and the upper turbine was located 24 inches above the lower turbine. The agitators in reaction chambers B, C and D were six-bladed open swept back turbines 20 inches in diameter with blades approximately 3¾ inches wide. Two such turbines were disposed in each of reaction chambers B, C and D, with the lower turbine 16 inches from the bottom of the chamber and the upper turbine 24 inches above the lower turbine.

The cellulose charge port 17 was approximately 10 inches in diameter, and the nitrating mixture charge means 18 consisted of 4 fishtail spray nozzles disposed at 90° intervals around the periphery of the cellulose charge port.

With the agitators off, nitrating mixture preheated to 44° C. was started into reaction chamber A through the fishtail nozzles at a rate of 25 gallons per minute. When reaction chambers A and B were filled with nitrating mixture to the operating level, and nitrating mixture commenced flowing over weir 12 into reaction chamber C, the agitator in reaction chamber A was started and adjusted to rotate at 100 r.p.m. The cellulose feed, shredded wood pulp, was then started into reaction chamber A at a rate of 12.9 pounds per minute, thus making the ratio of nitrating mixture to cellulose of 26 to 1 by weight. Four minutes after initially starting the cellulose feed, the agitator in reaction chamber B was started and adjusted to rotate at 95 r.p.m. Four minutes later the agitators in reaction chambers C and D were started and adjusted to rotate at 65 r.p.m. The unit was then on stream, and the overflow weirs were adjusted to provide an overall hydraulic gradient between the level of slurry in reaction chamber A and the overflow into nitrocellulose discharge port 19 of about 8 inches, thus providing for a drop of about 2 inches in the slurry level in each succeeding reaction chamber. The running heads over the overflow weirs was about 1 inch deep. This adjustment provided a residence time of charged material in the nitrating vessel of about 18 minutes. Operation was continuous with no plug-ups or settling out or segregation of cellulosic phase anywhere in the nitrating vessel. Mixing was excellent in all reaction chambers with substantially uniform dispersion of the cellulosic phase being maintained throughout all parts of the nitrating vessel.

The nitrocellulose produced had a nitrogen content of 12.1%. A 12.2% by weight test solution of this nitrocellulose dissolved in a solvent composed of 55% toluene, 20% ethyl acetate and 25% ethyl alcohol, by weight, was smooth and sparkling clear, and free of any undissolved particles or fibers, thus demonstrating that the nitrocellulose produced was quite satisfactorily uniform. The viscosity of this test solution at 25° C. by the standard ASTM falling ball method was 330 seconds. This nitrocellulose after subsequent treatment involving wringing, drowning, washing, purification, digestion and dehydration was suitable for use in all applications wherein a standard RS ½ second type nitrocellulose is required.

The nitrating mixture employed in this example had the following composition:

Nitrating Mixture Composition:     Percent by weight
Nitric acid _____ 43.40
Sulfuric acid _____ 36.40
Water _____ 15.60
Oxide content expressed as $HNOSO_4$ _____ 4.60

EXAMPLE 2

Substantially the same apparatus and procedure as set forth in Example 1 were employed in this example. Pertinent data with respect to nitrating mixture composition, cellulose feed stock, temperature, feed rates, residence time, agitator speeds, and product characteristics follow:

Nitrating Mixture Composition:
- Nitric acid _____ 24.90 percent by weight.
- Sulfuric acid _____ 50.50 percent by weight.
- Water _____ 16.05 percent by weight.
- Oxide content expressed as $HNOSO_4$ _____ 8.55 percent by weight.

Cellulose type _____ Picked linters.
Temperature _____ 40° C.
Cellulose feed rate _____ 13.72 pounds per minute.
Nitrating mixture feed rate _____ 40 gallons per minute.
Ratio nitrating mixture to cellulose _____ 39 to 1 by weight.
Residence time in nitrator _ Approximately 18 minutes.

Agitator Speeds:
- Reaction chamber A _ 155 r.p.m.
- Reaction chamber B _ 155 r.p.m.
- Reaction chamber C _ 155 r.p.m.
- Reaction chamber D _ 70 r.p.m.

Percent nitrogen in nitrocellulose _____ 12.23 percent by weight.
Nitrocellulose viscosity (ASTM falling ball) ___ 760 seconds.
Solution appearance _____ Clear, smooth, free of undissolved particles or fibers.

EXAMPLE 3

Substantially the same apparatus and procedure as set forth in Example 1 were employed in this example. Pertinent data with respect to nitrating mixture, cellulose employed, temperature, feed rates, residence time, agitator speeds, and product characteristics follow:

Nitrating Mixture Composition:
- Nitric acid _____ 43.40 percent by weight.
- Sulfuric acid _____ 36.16 percent by weight.
- Water _____ 14.90 percent by weight.
- Oxide content expressed as $HNOSO_4$ _____ 5.54 percent by weight.

Cellulose type _____ Shredded wood pulp.
Temperature _____ 44° C.
Cellulose feed rate _____ 23.20 pounds per minute.
Nitrating mixture feed rate _____ 49.5 gallons per minute.
Ratio nitrating mixture to cellulose _____ 27 to 1 by weight.
Residence time _____ Approximately 18 minutes.

Agitator Speeds:
- Reaction chamber A _ 120 r.p.m.
- Reaction chamber B _ 155 r.p.m
- Reaction chamber C _ 155 r.p.m.
- Reaction chamber D _ 45 r.p.m.

Percent nitrogen in nitrocellulose _____ 12.03 percent by weight.
Nitrocellulose viscosity (ASTM falling ball) ___ 650 seconds.
Solution appearance _____ Clear, smooth, free of undissolved particles or fibers.

It is evident from the foregoing description that there are various factors which will influence conditions for the most satisfactory operation of this invention. In this connection it should also be noted that means for adding extra nitrating mixture or acid into each chamber may be employed for flushing down the walls of the chamber, for flushing out the chamber between changes of nitrocellulose type being manufactured, and for level control in case of a plug-up. Moreover, it has been observed that as nitration progresses the reaction slurry usually becomes more fluid so that some of the nitrating mixture could be withdrawn from the slurry if desired. This practice has the effect of increasing the potential capacity of a given unit. A convenient means for effecting such withdrawal is to provide a suitably valved and screened exit port in the wall of each chamber for removing controlled amounts of nitrating mixture from the reaction slurry as nitration progresses. Nitration mixtures so withdrawn may be recycled to the nitration reaction.

It is also evident from the foregoing description that this invention provides an eminently satisfactory method and apparatus for the continuous nitration of cellulose, having distinct advantages over prior art apparatus and methods of nitration. Among the advantages realized by practice of this invention is a marked reduction in manpower requirements, a more uniform processing of the reactants with consequent better uniformity in the resultant nitrocellulose, an ability to handle more concentrated reaction slurries than has been possible heretofore, and the process and apparatus lend themselves readily to automatic control.

This is a continuation-in-part of application Serial No. 584,957, filed May 15, 1956, by Warren L. Plunkett.

What I claim and desire to protect by Letters Patent is:

1. A continuous process for the manufacture of nitrocellulose which comprises continuously forming a slurry of cellulose in nitrating mixture, continuously advancing the slurry under the influence of hydraulic gradient in an alternately descending and ascending path formed by a succession of alternately descending and ascending reaction zones to form nitrocellulose while preventing recirculation of said slurry from a succeeding reaction zone back into a preceding reaction zone, continuously agitating the slurry in each reaction zone solely to prevent segregation of solids therefrom, and continuously withdrawing a slurry of nitrocellulose in spent nitrating mixture from the final reaction zone.

2. The process in accordance with claim 1 wherein the nitrating mixture comprises a mixture of nitric and sulfuric acids.

3. The process in accordance with claim 1 wherein the nitrating mixture essentially contains between about 45% and about 94% nitric acid, between about 3.3% and about 34% magnesium nitrate and between about 2.7% and about 21% water by weight, the ratio of magnesium nitrate to water being at least about 1.2:1 and not more than about 2.2:1.

4. The process in accordance with claim 1 wherein the nitrating mixture comprises a mixture of nitric and phosphoric acids.

5. The process in accordance with claim 1 wherein the slurry advances through at least four successive reaction zones.

6. A continuous process for the manufacture of nitrocellulose which comprises continuously introducing separate streams of cellulose and nitrating mixture into a first reaction zone with rapid wetting of said cellulose with said nitrating mixture to form a slurry, continuously advancing the slurry under the influence of hydraulic gradient in an alternately descending and ascending path formed by a succession of alternately descending and ascending reaction zones to form nitrocellulose while preventing recirculation of said slurry from a succeeding reaction zone back into a preceding reaction zone, continuously agitating the slurry in each reaction zone solely to prevent segregation of solids therefrom, and continuously withdrawing a slurry of nitrocellulose in spent nitrating mixture from the final reaction zone.

7. A continuous process for the manufacture of nitrocellulose which comprises continuously introducing separate streams of cellulose and nitrating mixture into a first reaction zone with rapid wetting of said cellulose with said nitrating mixture to form a slurry, continuously advancing the slurry under the influence of hydraulic gradient in an alternately descending and ascending path formed by a succession of alternately descending and ascending reaction zones while preventing recirculation of said slurry from a succeeding reaction zone back into a preceding reaction zone, controlling the rate of advancement of the slurry by controlling the rate of introduction of the cellulose and the nitrating mixture to effect substantially uniform nitration of the cellulose, continuously agitating the slurry in each reaction zone solely to prevent segregation of solids therefrom, and continuously withdrawing a slurry of nitrocellulose in spent nitrating mixture from the final reaction zone.

8. A continuous process for the manufacture of nitrocellulose which comprises continuously introducing separate streams of cellulose and nitrating mixture into a first reaction zone with rapid wetting of said cellulose by spraying with said nitrating mixture to form a slurry, continuously advancing the slurry under the influence of hydraulic gradient in an alternately descending and ascending path formed by a succession of alternately descending and ascending reaction zones to form nitrocellulose while preventing recirculation of said slurry from a succeeding reaction zone back into a preceding reaction zone, continuously agitating the slurry in each reaction zone solely to prevent segregation of solids therefrom, and continuously withdrawing a slurry of nitrocellulose in spent nitrating mixture from the final reaction zone.

9. A continuous process for the manufacture of nitrocellulose which comprises continuously introducing separate streams of cellulose and nitrating mixture into a first reaction zone with rapid wetting of said cellulose by spraying with said nitrating mixture to form a slurry, continuously advancing the slurry under the influence of hydraulic gradient in an alternately descending and ascending path formed by a succession of alternately descending and ascending reaction zones while preventing recirculation of said slurry from a succeeding reaction zone back into a preceding reaction zone, controlling the rate of advancement of the slurry by controlling the rate of introduction of the cellulose and the nitrating mixture to effect substantially uniform nitration of the cellulose, continuously agitating the slurry in each reaction zone solely to prevent segregation of solids therefrom, and continuously withdrawing a slurry of nitrocellulose in spent nitrating mixture from the final reaction zone.

10. A continuous process for the manufacture of nitrocellulose which comprises continuously introducing separate streams of cellulose and nitrating mixture into a first reaction chamber, spraying the cellulose with part of the nitrating mixture to rapidly wet said cellulose and form a slurry and directing another part of said nitrating mixture onto the exposed surfaces of said reaction chamber to wash said surfaces and prevent accumulation of cellulose dust thereon, continuously advancing the slurry under the influence of hydraulic gradient in an alternately descending and ascending path formed by a succession of alternately descending and ascending reaction zones while preventing recirculation of said slurry from a succeeding reaction zone back into a preceding reaction zone, controlling the rate of advancement of the slurry by controlling the rate of introduction of the cellulose and the nitrating mixture to effect substantially uniform nitration of the cellulose, continuously agitating the slurry in each reaction zone solely to prevent segregation of solids therefrom, and continuously withdrawing a slurry of nitrocellulose in spent nitrating mixture from the final reaction zone.

References Cited in the file of this patent

UNITED STATES PATENTS

| | | |
|---|---|---|
| 2,377,435 | McKee | June 5, 1945 |
| 2,384,415 | Berl | Sept. 4, 1945 |
| 2,679,982 | Thyle | June 1, 1954 |
| 2,776,964 | McMillan et al. | Jan. 8, 1957 |

FOREIGN PATENTS

| | | |
|---|---|---|
| 758,366 | Great Britain | Oct. 3, 1956 |
| 670,242 | Germany | Jan. 14, 1939 |